US010310369B2

(12) United States Patent
Dominguez-Montes

(10) Patent No.: US 10,310,369 B2
(45) Date of Patent: Jun. 4, 2019

(54) STEREOSCOPIC REPRODUCTION SYSTEM USING TRANSPARENCY

(71) Applicant: Juan Dominguez-Montes, Las Rozas (ES)

(72) Inventor: Juan Dominguez-Montes, Las Rozas (ES)

(73) Assignee: Camila Ochoa Salud, Madrid (ES)

( * ) Notice: Subject to any disclaimer, the term of this patent is extended or adjusted under 35 U.S.C. 154(b) by 83 days.

(21) Appl. No.: 15/550,310

(22) PCT Filed: Jan. 11, 2016

(86) PCT No.: PCT/EP2016/050363
§ 371 (c)(1),
(2) Date: Aug. 10, 2017

(87) PCT Pub. No.: WO2016/128157
PCT Pub. Date: Aug. 18, 2016

(65) Prior Publication Data
US 2018/0017858 A1      Jan. 18, 2018

(30) Foreign Application Priority Data

Feb. 10, 2015    (EP) .................................... 15382043

(51) Int. Cl.
*G03B 35/18*      (2006.01)
*G02B 27/22*      (2018.01)
(Continued)

(52) U.S. Cl.
CPC ......... *G03B 35/18* (2013.01); *G02B 27/0093* (2013.01); *G02B 27/2214* (2013.01);
(Continued)

(58) Field of Classification Search
None
See application file for complete search history.

(56) References Cited

U.S. PATENT DOCUMENTS

| 5,016,282 A | 5/1991 | Tomono et al. |
| 5,621,457 A | 4/1997 | Ishiwaka et al. |

(Continued)

FOREIGN PATENT DOCUMENTS

| DE | 4123895 | 1/1993 |
| EP | 0114406 | 8/1984 |

(Continued)

OTHER PUBLICATIONS

"International Application No. PCT/EP2016/050363, International Search Report and Written Opinion dated May 3, 2016", (May 3, 2016), 10 pgs.

(Continued)

*Primary Examiner* — Mohammed Jebari
(74) *Attorney, Agent, or Firm* — Schwegman Lundberg & Woessner, P.A.

(57) ABSTRACT

The invention relates to a stereoscopic reproduction system without glasses, comprising an image reproduction device using transparency acting as means for illuminating multiple viewers with polarized light, two image capture elements separated from one another, containing polarizing filters that allow each of them to capture two images, one with the reflection of the light in the corneas and the other one eliminating said reflection, processing means for obtaining the pixel-by-pixel subtraction of those two images, the location of each eye in each image being obtained as the geometric center of the reflections in each cornea and the parallax of each eye between the two capture elements. With this data, the processing means generate as many luminous rectangles on a screen which backlights an array of converging lenses, which in turn focuses each of these luminous rectangles on the eye of each viewer after going through an image reproduction screen using transparency in which two images corresponding to the right eye and to the left eye are (Continued)

reproduced in synchronization with illumination of the luminous rectangles corresponding to each eye.

13 Claims, 7 Drawing Sheets

(51) Int. Cl.
| | |
|---|---|
| H04N 13/00 | (2018.01) |
| G02B 27/26 | (2006.01) |
| G03B 35/24 | (2006.01) |
| G02B 27/00 | (2006.01) |
| H04N 13/32 | (2018.01) |
| H04N 13/361 | (2018.01) |
| H04N 21/234 | (2011.01) |
| H04N 13/383 | (2018.01) |

(52) U.S. Cl.
CPC ............ *G02B 27/26* (2013.01); *G03B 35/24* (2013.01); *H04N 13/32* (2018.05); *H04N 13/361* (2018.05); *H04N 13/383* (2018.05); *H04N 2013/0074* (2013.01)

(56) References Cited

U.S. PATENT DOCUMENTS

| | | | | |
|---|---|---|---|---|
| 5,959,664 | A * | 9/1999 | Woodgate | G02B 27/0093 348/51 |
| 5,976,017 | A | 11/1999 | Omori et al. | |
| 6,014,164 | A * | 1/2000 | Woodgate | G02B 27/0093 348/51 |
| 6,473,141 | B2 * | 10/2002 | Moseley | H04N 13/351 349/15 |
| 7,298,552 | B2 * | 11/2007 | Redert | G02B 27/2214 348/56 |
| 7,425,069 | B2 * | 9/2008 | Schwerdtner | H04N 13/32 353/7 |
| 10,054,732 | B2 * | 8/2018 | Robinson | G02B 27/26 |
| 2002/0051118 | A1 | 5/2002 | Takagi et al. | |
| 2005/0018288 | A1 * | 1/2005 | Redert | G02B 27/0093 359/462 |
| 2005/0111100 | A1 * | 5/2005 | Mather | G02F 1/1323 359/464 |

FOREIGN PATENT DOCUMENTS

| | | |
|---|---|---|
| EP | 0350957 | 1/1990 |
| EP | 0576106 | 12/1993 |
| EP | 0654951 | 5/1995 |
| EP | 0656555 | 6/1995 |
| EP | 0935154 | 8/1999 |
| EP | 2317367 | 5/2011 |
| GB | 2272597 | 5/1994 |
| WO | WO-128157 | 8/2016 |

OTHER PUBLICATIONS

"European Application No. 15382043.6, Extended European Search Report dated Aug. 11, 2015", (Aug. 11, 2015), 4 pgs.

Schwartz, Arnold, "Head Tracking Stereoscopic Display", Proceedings of the SID, Society for Information Display, vol. 27, No. 2, Jan. 1, 1986, pp. 133-137, Playa del Rey CA, (Jan. 1, 1986), 133-137.

* cited by examiner

STEREOSCOPIC REPRODUCTION SYSTEM USING TRANSPARENCY

PRIORITY CLAIM TO RELATED APPLICATIONS

This application is a U.S. national stage application filed under 35 U.S.C. § 371 from International Application Serial No. PCT/EP2016/050363, which was filed 11 Jan. 2016, and published as WO2016/128157 on 18 Aug. 2016, and which claims priority to European Application No. 15382043.6, filed 10 Feb. 2015, which applications and publication are incorporated by reference as if reproduced herein and made a part hereof in their entirety, and the benefit of priority of each of which is claimed herein.

OBJECT OF THE INVENTION

The present invention relates to a stereoscopic reproduction system, a term which is used herein to designate systems using only two images, one for each eye, in image capture and reproduction.

BACKGROUND OF THE INVENTION

There are various systems and methods for making a different image reach each eye of a viewer. First are the systems which force the viewer to use glasses with different polarized, colored or shutter-based filters, or to use deflecting prisms or mirrors, and there are those which force the viewer to keep his/her head still in a certain position. Despite the obvious discomforts, these systems are quite widespread.

Systems and methods that do not require placing any device before the eyes of the viewers have been developed in an attempt to prevent said discomforts. Among such systems and methods are those herein referred to as three-dimensional systems, which use more than two reproduced images. Some of the systems or methods using two or very few images in reproduction are briefly discussed below.

Documents DE4123895 and EP0114406 describe methods and systems for three-dimensional reproduction for a large number of viewers using a small number of images. The different images are sequentially projected on a conventional diffusion screen and each viewer views through a shutter panel, preferably made with liquid crystal, located opposite and close to each viewer. Although discomforts occurring due to using glasses are prevented, the difficulty and high cost resulting from having to arrange a shutter panel before each viewer must be mentioned.

Documents GB2272597 and EP0656555A1 describe an image reproduction device using transparency, which is backlit by means of a device made up of a discrete assembly of light sources that are activated according to a signal sent from a detector detecting the location of the eyes of the viewers. Given the scarce depth of field of the detection and backlighting system, the eyes of the viewers must be located in one and the same plane, which is an important restriction.

Document EP2317367 describes an image reproduction device for reproducing images on a diffusion screen. The proposed system for detecting the eyes of the viewers is not capable of detecting the back and forth movements of viewers, and therefore the eyes of the viewers must be located in one and the same plane, which is an important restriction. Furthermore, tracking the head of the viewers requires mechanical movement of the optical focusing systems.

Document EP0576106 describes a device similar to that of GB2272597. The illuminating system differs from the one described in GB2272597 in that it includes a conventional image reproduction screen, which allows focusing on a large number of viewers with continuous tracking of their eyes. Nevertheless, due to its lack of depth of field, the eyes of the viewers must be located in one and the same plane, which in some cases may be a horizontal plane.

Document U.S. Pat. No. 5,976,017 describes a stereoscopic video game without glasses using a complex backlighting system because it needs several large-sized converging optical elements with focal lengths proportional to that size, whereby obtaining a system that takes up a large space and has a very small viewing angle. It furthermore uses a method for detecting the spatial location of the eyes of the viewers which needs as many cameras and as many light sources as there are viewers.

Document U.S. Pat. No. 5,016,282 and document EP0350957A both describe one and the same system capable of detecting eye movement and the gaze direction of a single viewer. The system is based, inter alia, on the fact that the polarized light used for illuminating the viewer is depolarized when it is reflected by any part of the viewer other than the cornea. In contrast, the rays reflected by the cornea conserve their polarization, given that the cornea acts like a polished surface. The system simultaneously captures two identical images of both the cornea and the retina from one and the same point, for which purpose it requires a special camera within which there are polarizing filters, discrimination prisms and image detecting elements. The system uses two different illuminating systems in the infrared spectrum, one close to the optical axis of the camera and the other one away from said optical axis, with two different wavelengths and frequency cut-off filters. The system described in this document is designed for capturing the gaze direction of a single viewer and is not valid for stereoscopic reproduction without glasses with multiple viewers.

Document US2002/0051118A describes a system for projecting an image on the retina of a single viewer, for which purpose it uses a detector for detecting the gaze direction of the viewer, which is not described in detail, and for stereoscopic reproduction it uses glasses.

Document U.S. Pat. No. 5,621,457 uses the light reflected in the cornea and in the retina by three different illuminating systems to find the gaze direction of a single viewer and is not valid for stereoscopic reproduction without glasses with multiple viewers.

DESCRIPTION OF THE INVENTION

The invention solves the mentioned problems in the state of the art by means of a stereoscopic reproduction system according to claim 1 and a stereoscopic reproduction method according to claim 12. Dependent claims define preferred embodiments of the invention.

The stereoscopic reproduction system of the invention comprises an image reproduction device using transparency, two image capture elements, an array of lenses, a luminous reproduction screen and processing means.

The image reproduction device using transparency comprises light polarizing means configured for polarizing light in a plane and is configured for being backlit with light in the visible spectrum, for linearly polarizing in a plane the light transmitted therethrough and for illuminating with said polarized transmitted light a field of view envisaged for the location of at least one viewer. The image reproduction device using transparency therefore illuminates the viewers with polarized light transmitted therethrough and being within visible light frequency spectrum.

The two image capture elements are arranged with their optical centers located in one and the same horizontal straight line and separated from one another by a distance D. Each image capture element comprises at least one digital camera and light polarizing means and is configured for capturing a pair of images of the same visual field, wherein said visual field contains the field of view, such that a first image of the pair is captured through polarizing means adapted for polarizing light in the same polarization plane as that of the light transmitted by the image reproduction device, and the second image of the pair is captured through polarizing means adapted for polarizing light in a plane perpendicular to the polarization plane of the light transmitted by the image reproduction device. The two image capture elements have the same focal length.

"Horizontal" will be understood to mean the direction perpendicular to the direction of gravity. Furthermore, the horizontal direction will generally be parallel to the straight line passing through the two eyes of a viewer present in the field of view.

The array of lenses comprises a plurality of spherical converging lenses having the same shape, size and focal length and being arranged substantially in the same plane. The array of lenses has a size equal to or greater than that of the image reproduction device.

The luminous reproduction screen is located parallel to the array of lenses and at a distance from the array equal to the focal length of the spherical converging lenses forming the array. The image reproduction device is arranged before the array of lenses, parallel to the array of lenses and to the luminous reproduction screen, such that the luminous reproduction screen is capable of backlighting the image reproduction device in its entirety with light in the visible spectrum.

The processing means are configured for subtracting pixel by pixel the luminous intensities of the two images of the pair of images captured by each image capture element. Two images of eyes are thereby obtained as a result, one for each image capture element, the only active pixels of which are the pixels in locations optically conjugated to those occupied by the eyes of the viewers present in the field of view when the two pairs of images are captured.

The processing means are additionally configured for calculating the parallax of each eye, obtaining said parallax based on the different position occupied by the eye in each of the two images of eyes obtained.

The processing means are additionally configured for reproducing on the luminous reproduction screen, for each spherical converging lens forming the array, an image of rectangles containing a number of luminous rectangles equal to the number of eyes present in an image of eyes, in which the position of the geometric center that each rectangle must occupy on the luminous reproduction screen is determined based on the parallax of each eye. Therefore, as many luminous rectangles as there are eyes that have been detected are reproduced in the part of the luminous reproduction screen located after each spherical converging lens forming the array, with the position of each rectangle determined according to the parallax of the corresponding eye. In other words, a number of rectangles corresponding to the product of the number of eyes detected times the number of spherical converging lenses is reproduced.

The processing means are configured for separating activation of the rectangles corresponding to the right eyes from that corresponding to the left eyes according to a stereoscopic signal received by the image reproduction device.

Advantageously, with the system of the invention it is not necessary to use specially designed cameras to capture the image of the eyes of the viewers, but rather it is possible to use conventional digital cameras operating in the visible light spectrum.

Furthermore, the use of two image capture elements located at two points separated from one another for capturing the image of the eyes allows calculating the parallax, or in other words, the distance from each eye to the image capture element. Advantageously, these two unique image capture elements are enough for capturing the location of each eye, i.e., the three spatial coordinates of the eyes of all the viewers, regardless of the number of viewers.

Finally, using an array or mosaic of small-sized lenses having a short focal length for illuminating the entire image reproduction device allows obtaining a system having very little volume, a large viewing angle and a depth of field of focus capable of focusing on each eye without needing the eyes of the viewers to be located in one and the same plane.

Advantageously, upon illuminating the region envisaged for the location of the viewers with the light transmitted by the image reproduction device, it is not necessary to use additional illuminating means that could be a discomfort for viewers. Nevertheless, it is possible to use additional illuminating means if desired.

The stereoscopic reproduction system of the invention is an auto-stereoscopic reproduction system, i.e., it allows image viewing by the spectators without needing to use glasses.

The spherical converging lenses are preferably arranged in the array adjacent to one another, without leaving free gaps between contiguous lenses.

The spherical converging lenses forming the array of lenses can be simple or composite lenses.

Simple lens will be understood as being made up of a single optical element.

Composite lens will be understood as comprising two or more optical elements arranged one after the other on one and the same axis. Preferably, said axis is substantially perpendicular to the plane of the array of lenses. The optical elements can have different shapes and be made from different materials. The optical elements of the composite lens can be in contact with or separated from one another and they together act as if they were a simple spherical converging lens.

The processing means are preferably configured for: calculating the parallax ($P_i$) of each eye based on the different position occupied by the eye in each of the images of eyes obtained as:

$$P_i = y_{Di} - y_{0i}$$

where $y_{Di}$ and $y_{0i}$ are the positions of the image of the eye i in the focal planes of the image capture elements; and, depending on the parallax, calculating the position of the geometric center that each of the rectangles must occupy on the focal plane of the spherical converging lenses:

$$y'_{hi} = \frac{F}{f}\left(\frac{h}{D}P_i + y_{0i}\right)$$

$$x'_{vi} = \frac{F}{f}\left(\frac{v}{D}P_i + x_{0i}\right)$$

where $x'_{vi}$ and $y'_{hi}$ are the coordinates of the geometric centers of the rectangles in the image of rectangles, $x_{Oi}$ and $y_{Oi}$ are the coordinates of the positions of the geometric centers of the eyes in the focal plane of the image capture element located at the point considered the origin of coordinates (0,0), F is the focal length of the spherical converging lenses forming the array, (h, v) is the position of the optical center of the corresponding spherical converging lens and f is the focal length of the image capture elements.

Therefore, the position that each of the luminous rectangles must occupy in the image of rectangles is calculated for each spherical converging lens forming the array.

In this embodiment, the width of each rectangle to be reproduced is made equal to or greater than the distance between the eyes of the corresponding viewer in the image of eyes multiplied by factor F/f, and the height of each rectangle is made equal to or greater than its width.

Upon illuminating each eye of each viewer with a luminous rectangle the width of which is greater than or equal to the distance between his/her eyes, it can be considered that each eye is located in the geometric center of the reflections, in said eye, of the images transmitted by the image reproduction device and of the different illuminating means, if any, obtaining the simultaneous detection of the location of the eyes of multiple viewers without needing to take into account the position and/or movement of the pupils of the viewer or knowledge about the gaze direction of the viewer.

The image capture elements of the reproduction system can be implemented in different ways. Some preferred embodiments are described below.

In one embodiment, at least one image capture element is configured for capturing the two images of the pair from two separate points in space and comprises a second digital camera and a semitransparent film. In this embodiment, the polarizing means of said image capture element comprise two polarizing filters and the two digital cameras of the image capture element have the same focal length. The semitransparent film is located forming a 45° angle with the focal plane of the first camera and such that it acts like a plane of symmetry between the optical centers of the two cameras, the semitransparent film transmitting 50% of the luminous intensity to one of the cameras and reflecting the rest to the other camera. One of the polarizing filters is arranged before the first camera and is configured for polarizing light in the same polarization plane as that of the light polarized and transmitted by the image reproduction device using transparency. The other polarizing filter is arranged before the second camera and is configured for polarizing light in the plane perpendicular to the polarization plane of the light polarized and transmitted by the image reproduction device using transparency.

In one embodiment, at least one image capture element is configured for capturing the two images of the pair from two separate points in space and comprises a second digital camera. In this embodiment, the two digital cameras of said image capture element have the same focal length. In this embodiment, the polarizing means of the image capture element comprise a semitransparent polarizing film, wherein the semitransparent polarizing film is located forming a 45° angle with the focal plane of the first camera and such that it acts like a plane of symmetry between the optical centers of the two cameras, the semitransparent polarizing film transmitting 50% of the luminous intensity to one of the cameras and reflecting the rest to the other camera, such that the transmitted light is linearly polarized in a plane perpendicular to the polarization plane of the reflected light, one of the polarization planes coinciding with the polarization plane of the light polarized and transmitted by the image reproduction device using transparency.

In one embodiment, at least one image capture element is configured for capturing the two images of the pair from a single point in two different instants and comprises a single digital camera. In this embodiment, the polarizing means of said image capture element comprise a polarizing filter arranged before the camera and a liquid crystal arranged before the polarizing filter. The polarizing filter is configured for polarizing light either in the same plane or in the plane perpendicular to the polarization plane of the light polarized and transmitted by the image reproduction device using transparency. The liquid crystal is configured for rotating the polarization plane 90° according to a signal received from the processing means. In this embodiment, the processing means are configured for controlling the angle of rotation of the liquid crystal depending on the corresponding even or odd image captured by the camera.

The two image capture elements of the system of the invention can be implemented according to the same embodiment or they can be implemented according to one embodiment each.

In one embodiment, the spherical converging lenses are conventional spherical converging lenses or spherical Fresnel lenses.

In one embodiment, the spherical converging lenses have a rectangular, triangular or hexagonal shape, the rectangular shape or the hexagonal shape being particularly preferred.

In one embodiment, the system of the invention comprises at least one light source for additionally illuminating the field of view and a polarizing filter arranged before each source, the polarizing filter being configured for polarizing light in the same plane as that of the light polarized and transmitted by the image reproduction device. In the case in which the illuminating means include more than one light source, all the polarizing filters arranged before the sources are configured for polarizing light in the same plane as that of the light polarized and transmitted by the image reproduction device using transparency.

In one embodiment, the luminous reproduction screen is selected from: a cathode ray tube, a plasma screen, the screen of a digital projector, a LED panel, an LCD player without a depolarizing diffusing film, and an LCD player with a depolarizing diffusing film.

In one embodiment, the image reproduction device is configured for reproducing images in color and the luminous reproduction screen is configured for reproducing the luminous rectangles in white. In another embodiment, the image reproduction device is configured for reproducing images in black and white, and the luminous reproduction screen is configured for sequentially reproducing the luminous rectangles in red, green and blue.

In a second aspect, the invention relates to a method comprising the following steps:

illuminating a field of view envisaged for the location of one or several viewers with light in the visible spectrum polarized in a plane;

capturing two pairs of images of the same visual field, said visual field containing the field of view, wherein each pair of images is taken by means of an image capture element, the optical centers of the two image capture elements being located in one and the same horizontal straight line (Y) and separated from one another by a distance D, capturing one of the images of each pair through polarizing means polarizing light in the same polarization plane as that of the polarized light used to illuminate the field of view and capturing the other image of each pair through polarizing means polarizing light in the perpendicular plane;

subtracting pixel by pixel the luminous intensities of the two images of each pair, obtaining as a result two images of eyes the only active pixels of which are pixels in locations optically conjugated to those occupied by the eyes of the viewers;

calculating the parallax of each eye, obtaining said parallax based on the different position occupied by the eye in each of the two images of eyes obtained, reproducing on a luminous reproduction screen a plurality of luminous rectangles, the reproduction screen being located parallel to an array of lenses comprising a plurality of spherical converging lenses having the same shape, size and focal length, the reproduction screen being located at a distance from the array equal to the focal length of the spherical converging lenses, wherein as many luminous rectangles as there are eyes in the image of eyes are reproduced in the part of the luminous reproduction screen located after each spherical converging lens forming the array, wherein the luminous rectangles are reproduced with positions determined based on the parallax calculated for the corresponding eye, and separating activation of the rectangles corresponding to the right eyes from that corresponding to the left eyes according to a stereoscopic signal received by an image reproduction device using transparency, the image reproduction device being arranged before the array of lenses, parallel thereto, and such that the luminous reproduction screen is capable of backlighting the image reproduction device in its entirety.

In one embodiment of the method of the invention, the parallax ($P_i$) of each eye is calculated based on the different position occupied by the eye in each image of eyes as:

$$P_i = y_{Di} - y_{0i}$$

where $y_{Di}$ and $y_{0i}$ are the positions of the image of the eye i in the focal planes of the image capture elements; and, depending on the parallax, the position of the geometric center that each of the rectangles must occupy on the focal plane of the array of lenses is calculated for each spherical converging lens of the array:

$$y'_{hi} = \frac{F}{f}\left(\frac{h}{D}P_i + y_{0i}\right)$$

$$x'_{vi} = \frac{F}{f}\left(\frac{v}{D}P_i + x_{0i}\right)$$

where $x'_{vi}$ and $y'_{hi}$ are the coordinates of the geometric centers of the rectangles in the image of rectangles, $x_{0i}$ and $y_{0i}$ are the coordinates of the positions of the geometric centers of the eyes in the focal plane of the image capture element located at the point considered the origin of coordinates (0,0), F is the focal length of the spherical converging lenses forming the array, (h, v) is the position of the optical center of the corresponding spherical converging lens and f is the focal length of the image capture elements. The width of each rectangle to be reproduced is preferably determined as the distance between the eyes of the corresponding viewer in the image of eyes multiplied by factor F/f, and the height of each rectangle is made equal to or greater than its width.

In a preferred embodiment, the method of the invention is carried out with a system according to the first inventive aspect.

All the features and/or steps of methods described in this specification (including the claims, description and drawings) can be combined in any way, with the exception of combinations of such mutually exclusive features.

DESCRIPTION OF THE DRAWINGS

To complement the following description and to aid in better understanding the features of the invention according to a preferred practical embodiment thereof, a set of drawings is attached as an integral part of said description in which the following is depicted with an illustrative and non-limiting character.

PREFERRED EMBODIMENT OF THE INVENTION

Figure 1:
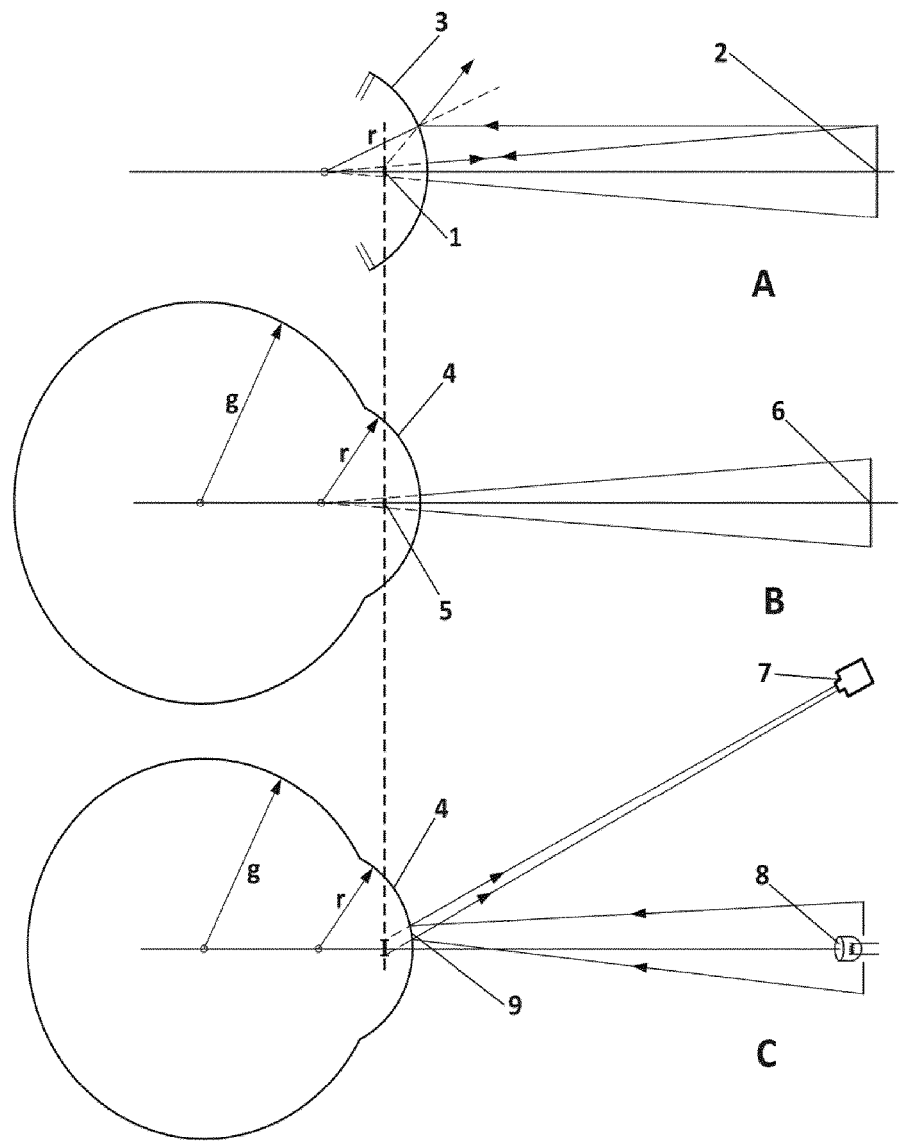
FIG. 1 shows the reflection of a light source in the cornea of a human eye.

The upper part A of FIG. 1 depicts the geometric construction, as it is conventionally depicted in optics, of the image (1) of an object (2) when it is reflected by a spherical mirror (3) having radius of curvature r. The central part B of FIG. 1 shows the eyeball, having radius g, of a human eye, in which the cornea (4) is distinguished, resembling a spherical surface having radius r and in which the image (5) of the object (6) is formed by reflection. The lower part C of FIG. 1 shows the location of the image (9) of a light source (8) which is observed from a camera (7) after having been reflected in the cornea (4).

Figure 2:
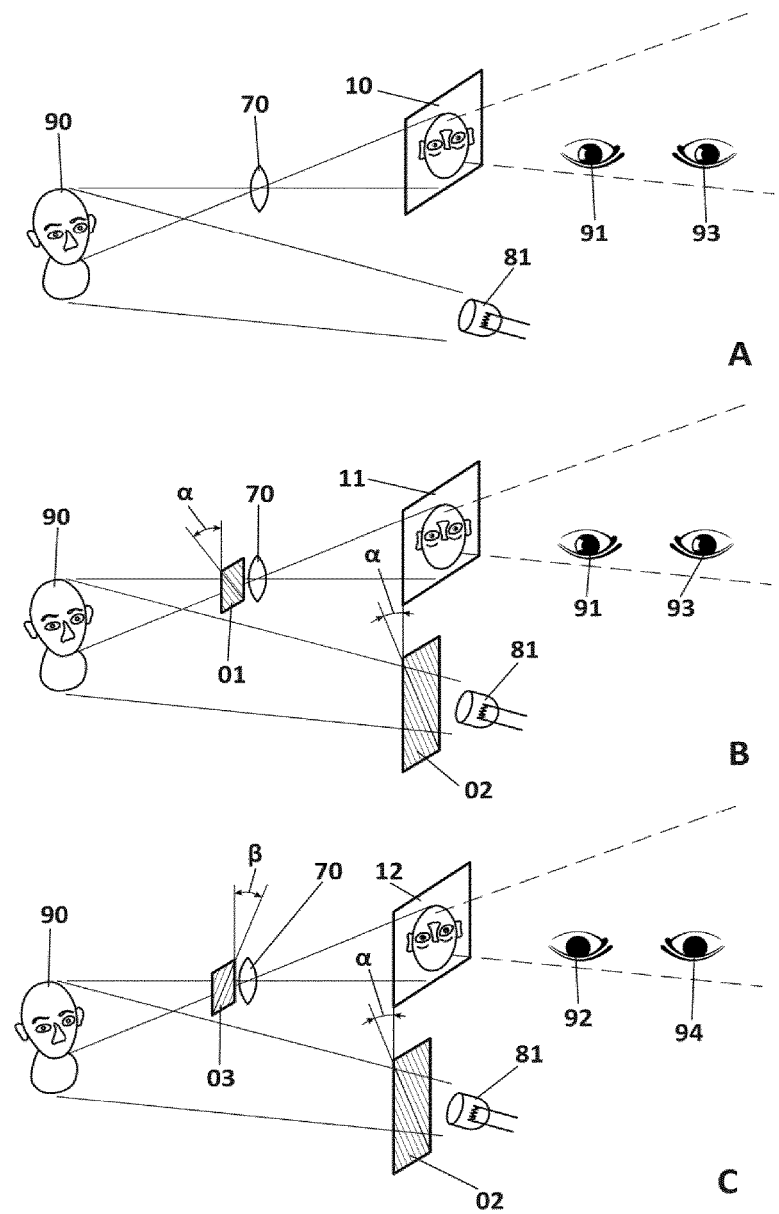
FIG. 2 shows the use of polarized light and the effect of the rotation of its polarization planes on the image reflected by the cornea of an eye.

The upper part A of FIG. 2 shows the capture of the image (10) of a viewer (90) through an optical system (70) belonging to a camera (not depicted). The viewer (90) is illuminated by a light source (81). The captured images (91, 93) from the reflections of the light source (81) on the corneas of the viewer (90) are drawn on the right side of the drawing.

The central part B of FIG. 2 shows the capture of the image (11) of the same viewer (90), captured through an optical system (70) before which there is arranged a first polarizing filter (01), allowing the passage of light linearly polarized in a direction α with respect to the vertical. The viewer (90) is illuminated by a light source (81) before which there is arranged a second polarizing filter (02), configured for linearly polarizing light in the same direction α as the first polarizing filter (01). The captured images (91, 93) from the reflections of the light source (81) on the corneas of the viewer (90) are depicted on the right side of the drawing.

The lower part C of FIG. 2 shows the capture of the image (12) of the viewer (90) through an optical system (70) before which there is arranged a first polarizing filter (03), allowing the passage of light linearly polarized in a direction −β with respect to the vertical. The viewer (90) is illuminated by a light source (81) before which there is arranged a second polarizing filter (02), configured for linearly polarizing light in a direction α perpendicular to the direction of polarization −β of the first polarizing filter. The reflections of the light source (81) on the corneas of the viewer (90) disappear in this case in the captured images (92, 94).

The light linearly polarized in a single plane used to illuminate the viewer (90) shown in B and C becomes blurry in the face and hair illumination process, i.e., it occupies all the polarization planes again, or in other words, it is depolarized. In contrast, the light reflected in the corneas conserves in its reflection the same polarization plane as that of the incident light, because the cornea acts like a polished surface. For this reason, the captured images (11, 12) of the viewer in the systems shown in parts B and C, respectively, of FIG. 2 are identical to one another with the exception of the parts occupied by the corneas (91, 93) which are visible in the image (11) captured with the system shown in B because the polarization planes of the capture filter (01) and the illumination filter (02) coincide. In contrast, in the image (12) shown in C the parts occupied by the corneas (92, 94) disappear from the image because the capture filter (03) and the illumination filter (02) are polarized in directions perpendicular to one another.

Figure 3:
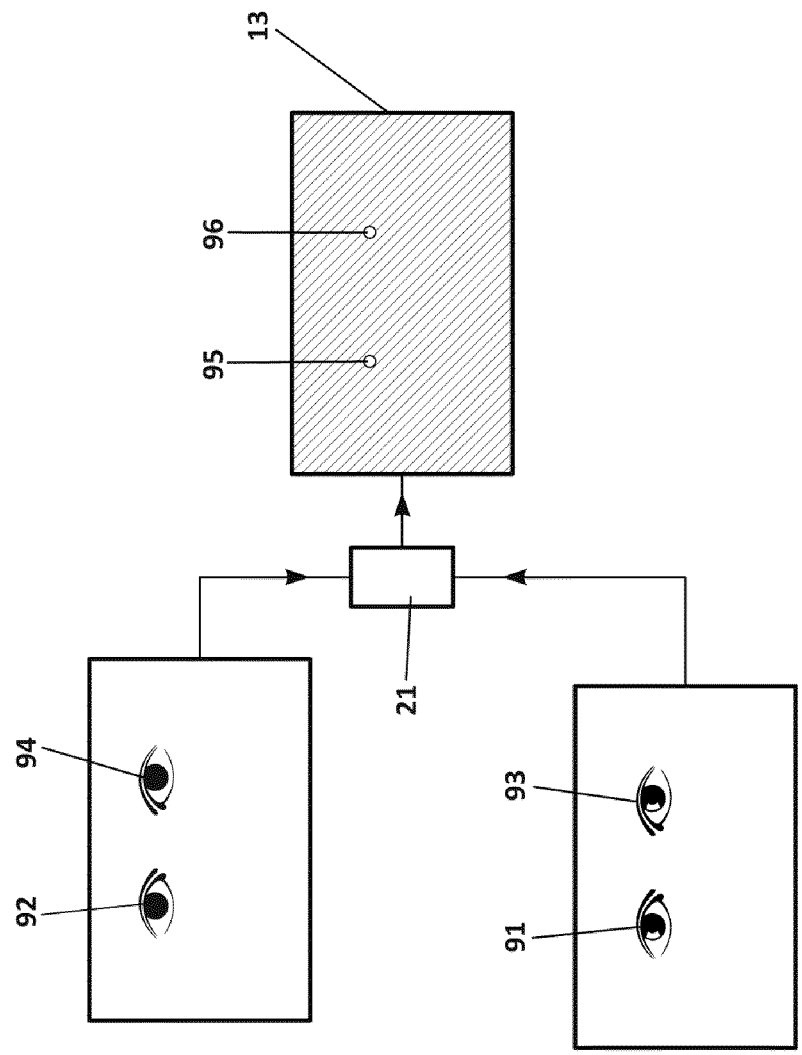
FIG. 3 shows the selection and isolation of the image reflected in the corneas of a viewer.

FIG. 3 shows images of the eyes (92, 94) obtained when the polarization planes of the polarizing capture filter (03) and illumination filter (02) are perpendicular to one another, as in the case of FIG. 2C, and the images (91, 93) obtained when the polarization planes of the polarizing capture filter (01) and illumination filter (02) coincide, as in the case of FIG. 2B.

FIG. 3 furthermore schematically depicts an information processor (21) the objective of which is to subtract pixel by pixel the luminous intensity of the first image (92, 94) and second image (91, 93), schematically depicted herein by the pupils. An image of eyes (13) is thus obtained as a result, the only active pixels of which would be the pixels (95, 96) in locations optically conjugated to those occupied by the reflections of the illuminating means in the corneas of the viewer.

Figure 4:
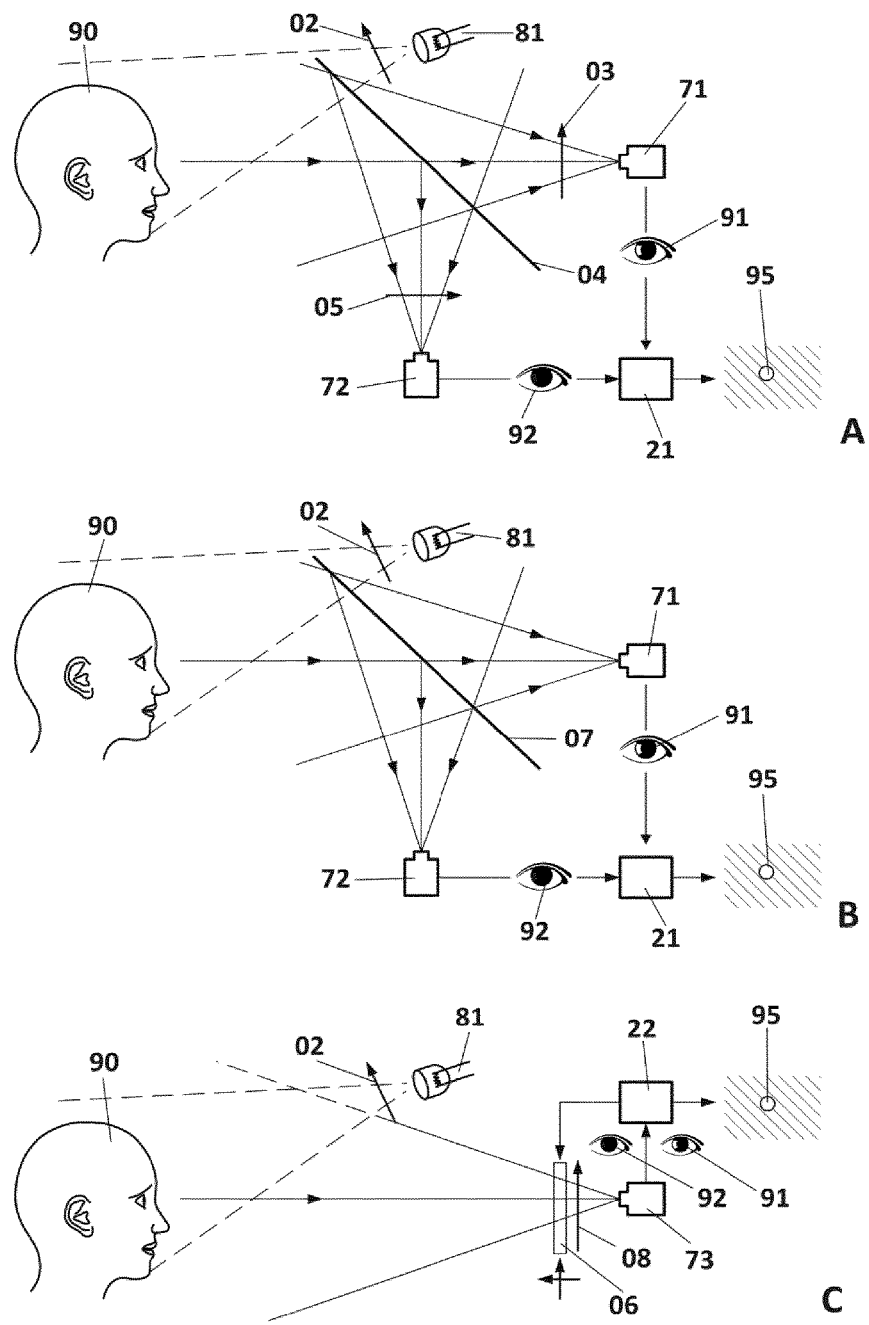
FIG. 4 shows three embodiments of the image capture element of the stereoscopic reproduction system of the invention.

FIG. 4 shows three embodiments of the image capture elements included in the stereoscopic reproduction system of the invention. Illuminating means intended for illuminating a field of view envisaged for one or several viewers, depicted in Figure as a single viewer (90) for the sake of simplicity, are depicted in FIG. 4. The field of view is illuminated with visible light linearly polarized in a plane, transmitted and polarized by the image reproduction device. Furthermore, additional illuminating means can be used for illuminating the field of view with light polarized in the same plane as the light transmitted and polarized by the image reproduction device. For the sake of simplicity, the means used to illuminate the field of view in the three embodiments of FIG. 4, including the illumination transmitted by the image reproduction device, have been depicted as a light source (81) with a polarizing filter (02) arranged before the source (81).

The image capture elements are configured for capturing a pair of images (91, 92) of the same visual field, where said visual field includes the field of view, such that each image of the pair (91, 92) is captured through a filter polarizing light in a different plane, both planes being perpendicular to one another, and one of the planes coinciding with the polarization plane of the light coming from the illuminating means. In the embodiments of FIGS. 4A and 4B, the pair of images (91, 92) is captured from two different spatial points, whereas in the embodiment of FIG. 4C, the pair of images (91, 92) is captured from a single point in different instants.

The upper part A of FIG. 4 shows a viewer (90) illuminated with linearly polarized light. In this embodiment, the image capture element includes two conventional digital cameras (71, 72) having the same optical characteristics, a polarizing filter (03, 05) arranged before each camera (71, 72) and a semitransparent film (04) located forming a 45° angle with the focal planes of the first camera (71) and second camera (72) and arranged forming a plane of symmetry between the optical centers of the two cameras (71, 72). The polarizing filter (03) arranged before the first camera (71) polarizes light in the same plane as that of the light used to illuminate the viewer, whereas the polarizing filter (05) arranged before the second camera (72) polarizes light in the plane perpendicular to that of the light used to illuminate the viewer.

In this embodiment, the image is captured through the semitransparent film (04), allowing passage of 50% of the luminous intensity to the first camera (71) and reflecting the remaining luminous intensity to the second camera (72). Since the semitransparent film (04) is located as and acts like a plane of symmetry between the two cameras (71, 72), the images captured by the two cameras (71, 72) are identical with the exception of the part corresponding to the light reflected in the corneas of the viewer. In one case, the image (91) captured by the first camera (71) appears with the reflection of the light source (81) in the cornea because the image is captured through a polarizing filter (03) polarizing linearly in the same plane as that of the light used to illuminate the viewer. In contrast, the reflection of the light source (92) in the cornea does not appear in the image (92) captured by the second camera (72) through the polarizing filter (05) polarizing light linearly in the plane perpendicular to that of the light used to illuminate the viewer.

The drawing also depicts a processor (21) configured for obtaining the image of eyes (95), which represents the location occupied by the eyes of the viewers, which image is obtained by subtracting the luminous intensities of the two captured images (91, 92) pixel by pixel. These captured images are identical, except in the corneas, because the optical centers of the cameras (71, 72) optically coincide and capture the same visual field.

The image capture element depicted in the central part B of FIG. 4 is identical to that of the preceding upper part A, except in this case the semitransparent film is a semitransparent polarizing film (07) and the cameras (71, 72) do not have a polarizing filter arranged before them. In fact, by using in this embodiment a semitransparent polarizing film (07), which in addition to allowing passage of 50% of the luminous intensity, linearly polarizes it in a plane perpendicular to the polarization plane of the light beam it reflects, it is not necessary to use polarizing filters arranged before the cameras. One of the polarization planes of the transmitted or reflected light must coincide with the polarization plane of the light used to illuminate the viewers. Like in the case of FIG. 4A, the captured images (91, 92) are identical, except in the corneas, because the optical centers of the conventional digital cameras (71, 72) are considered to optically coincide and because they capture the same visual field.

Like in FIGS. 4A and 4B, the lower part C of FIG. 4 shows the viewer (90) being illuminated with a light source

(81) before which there is arranged a polarizing filter (02) linearly polarizing light coming from the light source. In this embodiment, the image capture element includes a single conventional digital camera (73), a polarizing filter (08) arranged before the camera (73) and configured for polarizing light in the same plane as that of the light used to illuminate the viewer, and a liquid crystal (06) arranged before the polarizing filter (08) of the camera and configured for rotating the polarization plane 90° according to a signal received from a processor (22). The polarizing filter (08) used for image capture could also be configured for polarizing light in the plane perpendicular to that of the light used to illuminate the viewer.

In this case, the image is captured with the single camera (73) through the liquid crystal (06) and the polarizing filter (08) arranged before the camera (73), polarizing light in the same plane as that of the light used to illuminate the viewer. The processor (22) is configured for controlling the camera (73) and the angle of rotation of the liquid crystal (06), such that the captured images are time-division multiplexed, achieving for example that the reflections in the corneas are not captured by the even images because in that case the polarization plane is rotated by the liquid crystal (06) to be perpendicular to the polarization of illumination, the capture polarizing filter (08) preventing the passage of polarized incident light to the camera (73). In that case, the captured image will be the one shown with reference number 92. In the odd images, however, the reflection in the cornea (91) is captured because the polarization plane is not rotated in the liquid crystal, thereby remaining parallel to that of the light used to illuminate the viewer and to that of the polarizing filter (08). These captured images are identical except for the reflections in the corneas because they are both taken from the same optical center, which is that of the camera (73). The processor (22) is responsible for subtracting pixel by pixel the even images from the odd images captured by the conventional camera (73), obtaining as a result the image of eyes (95).

The method described in relation to the embodiment of FIG. 4C is valid provided that the multiplexing speed of the camera (73) and the same speed in the rotation of the polarization plane in the liquid crystal (06) are fast enough to allow considering that the viewer remains still in the time interval between two consecutive images.

The image capture element of the embodiments of FIG. 4 allows using conventional digital cameras and using as a light source the light coming from the luminous reproduction screen, which is polarized and transmitted by the image reproduction device using transparency, which does not represent a discomfort for viewers. Furthermore, other standard light sources with their corresponding polarizing filters can be added, which is an advantage with respect to earlier systems from the state of the art.

For the sake of simplicity, the image capture element depicted in the lower part C of FIG. 4, i.e., the one including a single camera, a polarizing filter and a liquid crystal, will be depicted as the image capture element in the remaining figures. Nevertheless, it will be understood that the image capture element of the embodiments shown in part A or part B of FIG. 4 could also be used. Furthermore, the two image capture elements of the system can be identical to one another or they can each be implemented according to one embodiment, for example, one of the image capture elements could be implemented according to the embodiment shown in FIG. 4A and the other image capture element could be implemented according to the embodiment shown in FIG. 4C.

Figure 5:
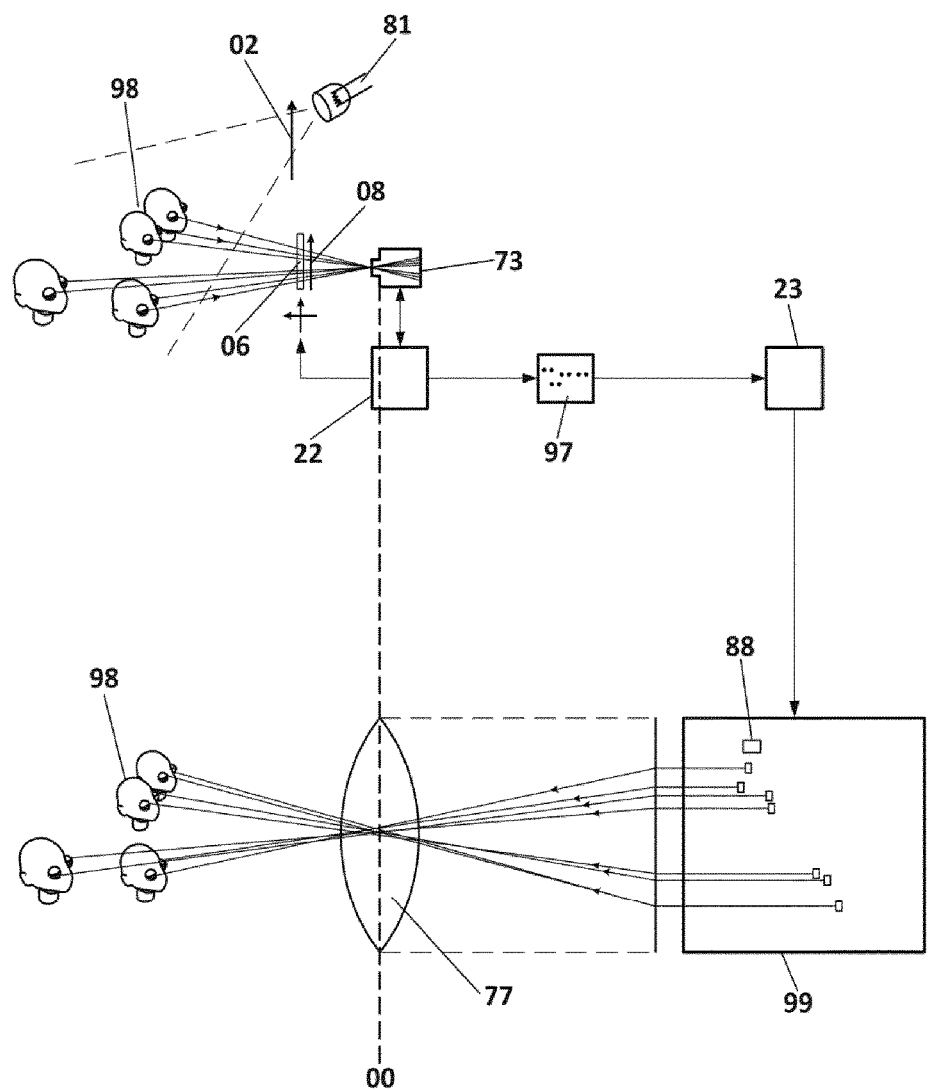
FIG. 5 illustrates obtaining, with the aid of a single camera, the spatial location of the eyes of the viewers and the sending of a light beam in the form of a rectangle to each of the eyes detected.

FIG. 5 schematically illustrates obtaining the spatial location of the eyes of a group of viewers (98) which would be obtained with the aid of a single conventional digital camera (73) and the formation of light beams in the form of rectangles which are sent to the eyes of the viewers according to the invention. The upper part of FIG. 5 shows an image capture element like the one described in reference to part C of FIG. 4.

A liquid crystal (06) and a polarizing filter (08) polarizing light in the same plane as the polarizing illumination filter (02) are arranged before the camera (73), which captures the location of the corneas of all the viewers. A first processor (22) controls the sequence of even and odd images with the angle of rotation of the liquid crystal (06) and sends to a second processor (23) an image of eyes (97) containing information about the location of all the reflections in the corneas of the viewers.

The second processor (23) receives the image of eyes (97) from the first processor (22), in which image each eye is represented by a group of pixels caused by the reflection of one or several light sources (81) in the corneas of the different viewers (depicted with reference number 9 in FIG. 1) and converts the image of eyes (97) into a second image in which each of the groups of pixels corresponding to an eye has been converted into a rectangle (88). To that end, the "geometric center" of the group of pixels corresponding to an eye is considered the location of said eye in the image of eyes (97). The second image, similar to the image of eyes (97), contains as many luminous rectangles as there are eyes in the image of eyes (97), and the location of the geometric centers of the rectangles is obtained based on the location of the geometric centers in the image of eyes (97), multiplied by the ratio of similarity between the image of eyes (97) and the image of rectangles containing the luminous rectangles.

Despite having described two different processors performing different functions, a single processor could be used configured for performing all the actions described for controlling the image sequence, detecting the location of eyes and generating the image of luminous rectangles.

The lower part of FIG. 5 shows a converging optical device (77). This converging optical device (77) represents a single spherical converging lens forming the array (78) and acts like the objective of a conventional projector. The luminous image reproduced on the luminous reproduction screen (99) containing the luminous rectangles is projected through the converging optical device (77) onto the group of viewers (98), each eye of each viewer receiving a light beam in the form of a rectangle. When the eye of a viewer receives a luminous rectangle, the viewer will see with that eye the entire surface occupied by the converging optical device (77) illuminated, and in the same way, the eye not receiving a luminous rectangle will see the surface occupied by said device (77) without illumination.

It has been assumed that the distance from the viewers to the optical centers of the camera (73) and of the converging optical device (77) is large enough with respect to the focal lengths of the camera and of the converging optical device (77) so that the images of eyes and of rectangles can be considered to be located in the focal plane of both the camera (73) and the converging optical device (77), and accordingly the ratio between the sizes of the image of eyes (97) and the image of rectangles is the same as the ratio between the focal lengths of the camera (73) and of the converging optical device (77). That is because if the converging optical device (77) has a focal length "F" and the camera has a focal length "f", the ratio of similarity between the size of the image of eyes (97) formed in the focal plane of the camera (73) and the size of the image of rectangles formed before the converging optical device (77) and in its focal plane, will be the ratio "f/F".

The width of the luminous rectangle corresponding to the eye of any one viewer is made equal to the distance between the eyes of said viewer in the image of eyes multiplied by the ratio of similarity F/f existing between the image of rectangles and the image of eyes (97). The height of said rectangle can be the same as the width of the rectangle or arbitrarily greater, provided that it does not invade the visual space of other viewers.

Figure 7:
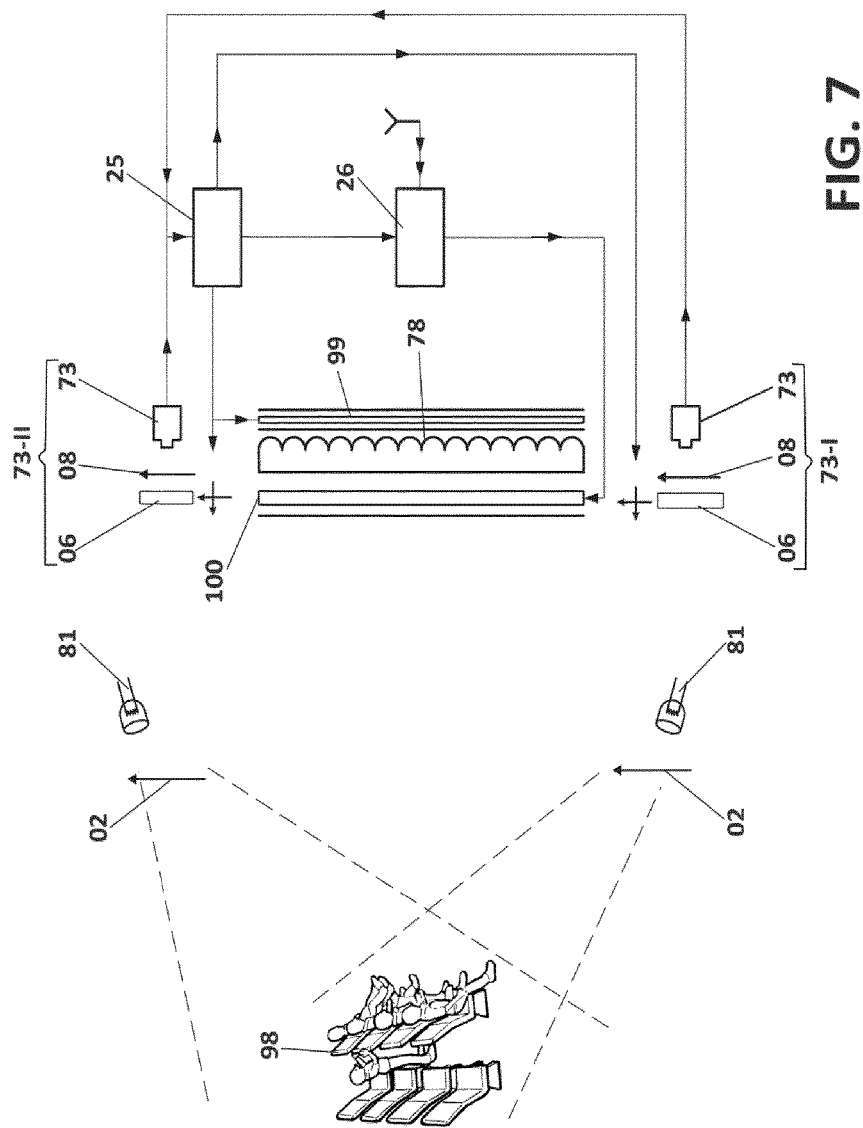
FIG. 7 shows an embodiment of the stereoscopic reproduction system of the invention.

FIG. 7 shows an embodiment of the stereoscopic reproduction system according to the invention capable of reproducing stereoscopic images without needing to use glasses and allowing viewers to move their heads freely. The stereoscopic reproduction system includes an image reproduction device (100) using transparency, two image capture elements (73-I, 73-II), an array of lenses (78), a luminous reproduction screen (99) and processing means (25, 26).

The image reproduction device (100) using transparency is configured for being backlit with light in the visible spectrum emitted by the luminous reproduction screen (99), for polarizing it in a plane and for illuminating with said polarized light a field of view envisaged for the location of one or several viewers (98).

The two image capture elements (73-I, 73-II) are arranged with their optical centers located in one and the same horizontal straight line (Y) and separated from one another by a distance D. Each image capture element (73-I, 73-II) is configured for capturing a pair of images (91, 92) of the same visual field, wherein said visual field contains the field of view. In this embodiment, each image capture element (73-I, 73-II) includes a single digital camera (73) with a polarizing filter (08) and a liquid crystal (06) arranged before it, the liquid crystals (06) being capable of rotating their polarization plane 90°.

The array of lenses (78) comprises a plurality of spherical converging lenses having the same focal length and being arranged substantially in the same plane. The array of lenses (78) has a size equal to or greater than that of the image reproduction device (100).

The luminous reproduction screen (99), the array of lenses (78) and the image reproduction device (100) are located parallel to one another, with the array of lenses (78) arranged between the luminous reproduction screen (99) and the image reproduction device (100) and such that the luminous reproduction screen (99) is capable of backlighting the image reproduction device (100) in its entirety. The luminous reproduction screen (99) is located at a distance from the array (78) equal to the focal length of the spherical converging lenses forming the array (78).

In this embodiment, the reproduction system furthermore includes light sources (81) for the additional illumination of the group of viewers (98) and a polarizing filter (02) arranged before each source (81). The polarizing filters (02) are configured for polarizing light in the same polarization plane as that of the light transmitted by the image reproduction device (100).

The processing means include a first processor (25) and a second processor (26).

The first processor (25) is configured for controlling the angle of rotation of the liquid crystal (06) depending on the even or odd image captured by the cameras (73).

The second processor (26) is responsible for subtracting pixel by pixel the even images from the odd images captured by each camera (73), obtaining as a result two images of eyes (97), in which each cornea of each eye is represented by a group of pixels caused by the reflection of the light coming from the image reproduction device (100) and the light sources (81), if there are any, in the corneas of the different viewers, and for converting the images of eyes (97) into a second image, called an "image of rectangles", in which each of the groups of pixels corresponding to an eye is converted into a rectangle (88). To that end, the "geometric center" of the group of pixels corresponding to an eye is considered the location of said eye in the image of eyes (97). The image of rectangles, similar to the image of eyes (97), contains as many luminous rectangles as there are eyes in an image of eyes (97), and the location of the geometric centers of said rectangles is obtained depending on the parallax of each eye, as explained below with the aid of FIG. 6.

In relation to the size of the rectangles, the width of each rectangle is made substantially equal to the distance between the eyes of each viewer in an image of eyes multiplied by factor F/f, and the height of the rectangle is made equal to or greater than its width, provided that the field of vision of the remaining viewers is not invaded, i.e., that there is no overlap of that rectangle with other rectangles.

Each spherical converging lens (77) forming the array of lenses (78) acts like the objective of a conventional projector. The image of rectangles containing the luminous rectangles is reproduced in the part of the luminous reproduction screen (99) located after each spherical converging lens (77) and projected through each spherical converging lens (77) forming the array of lenses (78) onto the group of viewers (98), each eye of each viewer receiving a light beam in the form of a rectangle from each spherical converging lens (77) forming the array (78). When the eye of a viewer receives a luminous rectangle, the viewer will see with that eye the entire surface occupied by the array of lenses (78) illuminated, and in the same way, the eye not receiving a luminous rectangle will see the surface occupied by the array of lenses (78) without illumination.

The second processor (26) is additionally configured for processing information with the stereoscopic images received from an external device for separating activation of the rectangles corresponding to the right eyes from that corresponding to the left eyes, according to the stereoscopic signal that is sent to the image reproduction device (100) using transparency, and for sending to the image reproduction device (100) the images corresponding to right eye and left eye in an alternating succession, and at the same time and in synchronization with these images, sending to the luminous reproduction screen (99) the alternating images with as many luminous rectangles as there are corneas corresponding to the right eyes and left eyes, respectively, detected. The luminous rectangles containing the image corresponding to the right eye and the image corresponding to the left eye, respectively, are thereby projected onto the eyes of each viewer detected.

Therefore, as many luminous rectangles as there are right eyes and left eyes detected are alternately reproduced on the luminous reproduction screen (99) for each spherical converging lens. Each of the viewers will see through the eye receiving a luminous rectangle the entire surface of the array (78) illuminated during the period of time in which the luminous rectangle remains active. Since the image reproduction device (100) using transparency is located in front of the array (78), the eye illuminated by the luminous rectangle will see the image reproduced in said image reproduction device (100) in that moment.

Despite having described two different processors performing different functions, a single processor configured for performing all the actions described for controlling the image sequence, detecting the location of eyes and generating the image of luminous rectangles could be used.

Advantageously, the use of an array or mosaic of small-sized lenses (78) allows using a short focal length and arranging the array of lenses (78) and the luminous reproduction screen (99) close to one another, thereby reducing the volume of the system and providing a depth of field of focus in the projection of the luminous rectangles onto the eyes of the viewers that is as wide as necessary by sufficiently reducing the focal length and size of the spherical converging lenses forming the array.

The spherical converging lenses forming part of the array (78) can be conventional spherical converging lenses or spherical Fresnel lenses.

The luminous reproduction screen (99) on which the luminous rectangles are reproduced can be, for example, a cathode ray tube, a plasma screen, the screen of a digital projector, a LED panel, or a conventional liquid crystal, as depicted in said FIG. 7. In the case of a liquid crystal, given that in a conventional player the liquid crystal is located between two polarized films, the polarizing filters before the luminous reproduction screen (99) and rear of the image reproduction device (100) can be the same if they both polarize light in the same plane. If they polarize in different planes, it will be necessary to use a diffusing and therefore depolarizing film on the luminous reproduction screen; said film is not depicted in this figure.

To favor transparency of the image reproduction device (100), the red, green and blue filters constituting each white pixel can be eliminated, this element being converted into a device for reproducing images in black and white. Color is achieved by making the rectangles reproduced on the luminous reproduction screen (99) alternate their red, blue and green color and in synchronization with these colors the image reproduction device (100) display the image in black and white with the corresponding color intensity.

Each image capture element in the embodiment described corresponds to the one depicted in part C of FIG. 4. However in some embodiment variants, one or both of the image capture elements can be replaced with the elements exemplified in part A or part B of FIG. 4. In those cases, the two cameras included in the image capture element act through the semitransparent film as if they were a single camera with a single optical center. In all cases, the processing means would be configured for obtaining the positions of the eyes by subtracting pixel by pixel the two images captured simultaneously by the two cameras included in the image capture element, shown in parts A and B of FIG. 4, or sequentially, as shown in part C of FIG. 4.

The image reproduction device (100) using transparency can be a conventional LCD player from which illuminating and light diffusion systems have been removed. Given that this image reproduction device using transparency acts by transmitting light and polarizing it, the polarization plane of the image reproduction device and that of the polarizing filter of the additional illuminating means, if any, must by the same.

Figure 6:
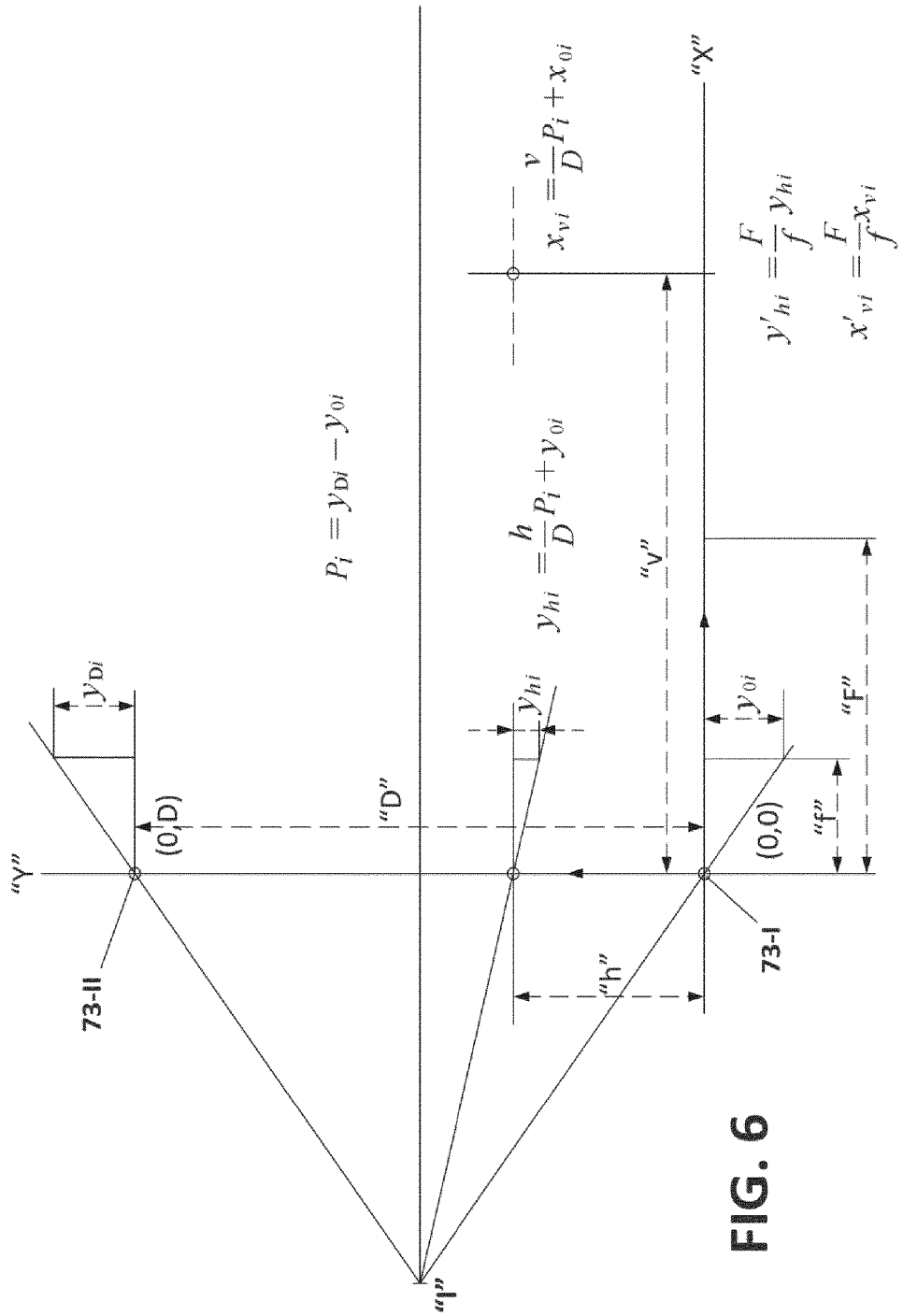
FIG. 6 shows the coordinates of the images of an eye in two different image capture elements and the mathematical formulas which, as a function of these locations, can be used to learn the coordinates of each image of each eye anywhere else there is a camera or a projector.

FIG. 6 graphically depicts the coordinates of the images of the eyes captured by two cameras (73-I, 73-II), one of the optical centers of which is located at point "0" and the other at distance "D" of one and the same horizontal line "Y" and the mathematical formulas which allow obtaining the coordinates in any other position (h,v) as a function on those initial positions.

It is assumed that the camera having its optical center located at the origin of coordinates (0, 0) and the other camera having the optical center at a distance "D" in the same horizontal axis "Y", i.e., at point (0, D), capture the image of an eye "I". The positions of the images of said eye I in the focal planes of said cameras will have the values $y_{Oi}, y_{Di}$, respectively, meaning that the parallax $P_i$ will be:

$$P_i = y_{Di} - y_{Oi}$$

When the optical center of the camera is located at horizontal distance "h" from the origin, the value of the coordinate $y_{hi}$ in said focal plane of the image of the eye I will be:

$$y_{hi} = \frac{h}{D} P_i + y_{0i}$$

Similarly, for any other value located at distance "v" in the vertical direction "X", the value will be:

$$x_{vi} = \frac{v}{D} P_i + x_{oi}$$

The location of the geometric centers of the luminous rectangles that must be reproduced on the luminous reproduction screen (99) can be calculated with these mathematical formulas.

If the array of lenses (78) has a focal length "F", corresponding to the focal length of the spherical converging lenses forming it and the camera has a focal length "f", the ratio between the sizes of the images of the corneas formed in the focal plane of the cameras and those formed in the focal plane of the array (78) will be the ratio "F/f", and the coordinates in the focal plane of the array (78) will be $x'_{vi}$ and $y'_{hi}$ determined by:

$$y'_{hi} = \frac{F}{f} y_{hi}$$

$$x'_{vi} = \frac{F}{f} x_{vi}$$

The invention claimed is:

1. A stereoscopic reproduction system, comprising:
an image reproduction device using transparency, comprising light polarizing means and configured for being backlit with light in the visible spectrum, for polarizing in a plane the light it transmits and for illuminating with said transmitted polarized light a field of view envisaged for the location of one or several viewers;
two image capture elements, the optical centers of which are located in one and the same horizontal straight line (Y) and separated from one another by a distance D, wherein each image capture element comprises at least one digital camera and light polarizing means, each image capture element being configured for capturing a pair of images of the same visual field, said visual field containing the field of view, such that a first image of the pair is captured through polarizing means adapted for polarizing light in the same polarization plane as that of the light transmitted by the image reproduction device, and the second image of the pair is captured through polarizing means adapted for polarizing light in a plane perpendicular to the polarization plane of the light transmitted by the image reproduction device;
an array of lenses comprising a plurality of spherical converging lenses having the same shape, size and focal length and being arranged substantially in the same plane, wherein the array of lenses has a size equal to or greater than that of the image reproduction device;

a luminous reproduction screen configured for emitting light in the visible spectrum, the luminous reproduction screen being located parallel to the array of lenses and at a distance from the array of lenses equal to the focal length of the spherical converging lenses forming the array; wherein the image reproduction device is arranged before the array of lenses, parallel to the array of lenses and to the luminous reproduction screen, such that the luminous reproduction screen is capable of backlighting the image reproduction device in its entirety, and processing means configured for:
  subtracting pixel by pixel the luminous intensities of the two images of the pair of images captured by each image capture element to obtain as a result two images of eyes, the only active pixels of which are pixels in locations optically conjugated to those occupied by the eyes of the viewers present in the field of view,
  calculating the parallax of each eye, obtaining said parallax based on the different position occupied by the eye in each of the two images of eyes obtained,
  reproducing on the luminous reproduction screen, for each of the spherical converging lenses forming the array of lenses, a number of luminous rectangles equal to the number of eyes present in an image of eyes, wherein the position of the geometric center that each rectangle must occupy on the luminous reproduction screen is calculated based on the parallax of each eye; and
  separating activation of the rectangles corresponding to the right eyes from that corresponding to the left eyes according to a stereoscopic signal received by the image reproduction device.

2. The stereoscopic reproduction system according to claim 1, wherein the processing means are configured for calculating the parallax ($P_i$) of each eye based on the different position occupied by the eye in each image of eyes as:

$$P_i = y_{Di} - y_{0i}$$

where $y_{Di}$ and $y_{0i}$ are the positions of the image of the eye i in the focal planes of the image capture elements; and,
  depending on the parallax, calculating for each spherical converging lens of the array of lenses the position of the geometric center that each of the rectangles must occupy on the focal plane of the array of lenses:

$$y'_{hi} = \frac{F}{f}\left(\frac{h}{D}P_i + y_{0i}\right)$$

$$x'_{vi} = \frac{F}{f}\left(\frac{v}{D}P_i + x_{0i}\right)$$

where $x'_{vi}$ and $y'_{hi}$ are the coordinates of the geometric centers of the rectangles in the image of rectangles, $x_{0i}$ and $y_{0i}$ are the coordinates of the positions of the geometric centers of the eyes in the focal plane of the image capture element located at the point considered the origin of coordinates (0,0), F is the focal length of the spherical converging lenses forming the array, (h, v) is the position of the optical center of the corresponding spherical converging lens, and f is the focal length of the image capture elements;
wherein the width of each rectangle to be reproduced is determined as the distance between the eyes of the corresponding viewer in the image of eyes multiplied by factor F/f, and the height of each rectangle is made equal to or greater than its width.

3. The stereoscopic reproduction system according to claim 1, additionally comprising one or several light sources and a polarizing filter arranged before each of the light sources, the polarizing filter being configured for polarizing light in the same polarization plane as that of the light transmitted by the image reproduction device.

4. The stereoscopic reproduction system according to claim 1, wherein at least one image capture element comprises a second digital camera, two polarizing filters and a semitransparent film, the two cameras having the same focal length, the semitransparent film being located forming a 45° angle with the focal plane of the first camera and such that it acts like a plane of symmetry between the optical centers of the two cameras, the semitransparent film transmitting 50% of the luminous intensity to the first camera and reflecting the rest to the second camera, one of the polarizing filters being arranged before the first camera and configured for polarizing light in the same polarization plane as that of the light transmitted by the image reproduction device, the other polarizing filter being arranged before the second camera and configured for polarizing light in a plane perpendicular to the polarization plane of the image reproduction device.

5. The stereoscopic reproduction system according to claim 1, wherein at least one image capture element comprises a second digital camera and a semitransparent polarizing film, the two cameras having the same focal length, the semitransparent polarizing film being located forming a 45° angle with the focal plane of the first camera and such that it acts like a plane of symmetry between the optical centers of the two cameras, the semitransparent polarizing film transmitting 50% of the luminous intensity to the first camera and reflecting the rest to the second camera and such that the transmitted light is linearly polarized in a plane perpendicular to the polarization plane of the reflected light, one of the polarization planes coinciding with the polarization plane of the image reproduction device.

6. The stereoscopic reproduction system according to claim 1, wherein at least one image capture element comprises a polarizing filter arranged before the digital camera and a liquid crystal arranged before the polarizing filter, the polarizing filter being configured for polarizing light either in the same plane or in the plane perpendicular to the polarization plane of the image reproduction device and the liquid crystal being configured for rotating the polarization plane 90° according to a signal received from the processing means, and wherein the processing means are configured for controlling the angle of rotation of the liquid crystal depending on the corresponding even or odd image captured by the camera.

7. The stereoscopic reproduction system according to claim 1, wherein
  the image reproduction device using transparency is configured for reproducing images in color, and the luminous reproduction screen is configured for reproducing the luminous rectangles in white, or
  the image reproduction device using transparency is configured for reproducing images in black and white, and the luminous reproduction screen is configured for sequentially reproducing the luminous rectangles in red, green and blue.

8. The stereoscopic reproduction system according to claim 1, wherein the spherical converging lenses are conventional spherical converging lenses or spherical Fresnel lenses.

9. The stereoscopic reproduction system according to claim 1, wherein the spherical converging lenses are simple lenses.

10. The stereoscopic reproduction system according to claim 1, wherein the spherical converging lenses are composite lenses.

11. The stereoscopic reproduction system according to claim 1, wherein the luminous reproduction screen is selected from: a cathode ray tube, a plasma screen, the screen of a digital projector, a LED panel, an LCD player without a depolarizing diffusing film and an LCD player with a depolarizing diffusing film.

12. A stereoscopic reproduction method comprising the following steps:
illuminating a field of view envisaged for the location of one or several viewers with light in the visible spectrum polarized in a plane;
capturing two pairs of images of the same visual field, said visual field containing the field of view, wherein each pair of images is taken by means of an image capture element, the optical centers of the two image capture elements being located in one and the same horizontal straight line (Y) and separated from one another by a distance D, capturing one of the images of each pair through polarizing means polarizing light in the same polarization plane as that of the polarized illumination light, and capturing the other image of each pair through polarizing means polarizing light in the perpendicular plane;
subtracting pixel by pixel the luminous intensities of the two images of each pair, obtaining as a result two images of eyes the only active pixels of which are pixels in locations optically conjugated to those occupied by the eyes of the viewers;
calculating the parallax of each eye, obtaining said parallax based on the different position occupied by the eye in each of the two images of eyes obtained,
reproducing on a luminous reproduction screen a plurality of luminous rectangles, the reproduction screen being located parallel to an array of lenses comprising a plurality of spherical converging lenses having the same shape, size and focal length, the luminous reproduction screen being located at a distance from the array equal to the focal length of the spherical converging lenses, wherein as many luminous rectangles as there are eyes in the image of eyes are reproduced in the part of the luminous reproduction screen located after each spherical converging lens forming the array, wherein the luminous rectangles are reproduced with positions determined based on the parallax calculated for the corresponding eye, and
separating activation of the rectangles corresponding to the right eyes from that corresponding to the left eyes according to a stereoscopic signal received by an image reproduction device using transparency, the image reproduction device being arranged before the array of lenses, parallel thereto, and such that the luminous reproduction screen is capable of backlighting the image reproduction device in its entirety.

13. The method according to claim 12, wherein:
the parallax ($P_i$) of each eye is calculated based on the different position occupied by the eye in each image of eyes as:

$$P_i = y_{Di} - y_{0i}$$

where $y_{Di}$ and $y_{0i}$ are the positions of the image of the eye i in the focal planes of the image capture elements;
and additionally comprising:
depending on the parallax, calculating for each spherical converging lens of the array the position of the geometric center that each of the rectangles must occupy on the focal plane of the array of lenses:

$$y'_{hi} = \frac{F}{f}\left(\frac{h}{D}P_i + y_{0i}\right)$$

$$x'_{vi} = \frac{F}{f}\left(\frac{v}{D}P_i + x_{0i}\right)$$

where $x'_{vi}$ and $y'_{hi}$ are the coordinates of the geometric centers of the rectangles in the image of rectangles, $x_{0i}$ and $y_{0i}$ are the coordinates of the positions of the geometric centers of the eyes in the focal plane of the image capture element located at the point considered the origin of coordinates (0,0), F is the focal length of the spherical converging lenses forming the array of lenses, (h, v) is the position of the optical center of the corresponding spherical converging lens and f is the focal length of the image capture elements;
wherein the width of each rectangle to be reproduced is determined as the distance between the eyes of the corresponding viewer in the image of eyes multiplied by factor F/f, and the height of each rectangle is made equal to or greater than its width.

* * * * *